(12) United States Patent
Bussieres

(10) Patent No.: US 10,876,571 B2
(45) Date of Patent: Dec. 29, 2020

(54) CONNECTING ROD

(71) Applicant: INNIO Jenbacher GmbH & Co OG, Tiro (AT)

(72) Inventor: Frederic Bussieres, Jenbach (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 15/773,189

(22) PCT Filed: Nov. 7, 2016

(86) PCT No.: PCT/EP2016/076816
§ 371 (c)(1),
(2) Date: May 3, 2018

(87) PCT Pub. No.: WO2017/077108
PCT Pub. Date: May 11, 2017

(65) Prior Publication Data
US 2018/0320730 A1    Nov. 8, 2018

(51) Int. Cl.
*F16C 7/02* (2006.01)
*F16C 9/04* (2006.01)

(52) U.S. Cl.
CPC ............... *F16C 7/023* (2013.01); *F16C 9/04* (2013.01); *F16C 2226/80* (2013.01); *F16C 2240/40* (2013.01); *F16C 2360/22* (2013.01)

(58) Field of Classification Search
CPC .... F16C 7/023; F16C 7/02; F16C 9/04; F16C 9/045; F16C 2240/40; F16C 2240/46
See application file for complete search history.

(56) References Cited

U.S. PATENT DOCUMENTS

| | | | | |
|---|---|---|---|---|
| 2,729,521 A | * | 1/1956 | Maybach | F16C 9/04 384/294 |
| 3,411,378 A | * | 11/1968 | Borgeaud | F16C 9/04 74/579 R |
| 4,198,879 A | * | 4/1980 | Hornak | B23P 15/00 29/464 |
| 4,688,446 A | * | 8/1987 | Ishikawa | F16C 9/04 74/579 E |
| 4,802,269 A | * | 2/1989 | Mukai | B23D 31/003 225/2 |

(Continued)

FOREIGN PATENT DOCUMENTS

CH      287653 A      12/1952
DE      25 39 334 A1   4/1976
(Continued)

OTHER PUBLICATIONS

First Office Action issued in connection with corresponding AT Application No. A50950/2015 dated Sep. 26, 2016.
(Continued)

*Primary Examiner* — Luis A Gonzalez
(74) *Attorney, Agent, or Firm* — Fletcher Yoder, P.C.

(57) ABSTRACT

A connecting rod is provided, which includes a rod shaft and a rod cap. The rod shaft and the rod cap can be releasably fastened through connecting means to form a connected state, and when the rod shaft and the rod cap are in the connected state, they form a rod eye configured to enclose a bore for mounting the connecting rod on a crank shaft. The rod shaft and the rod cap have contact surfaces at which they touch each other in the connected state. The contact surfaces have an interlocking section-wise serration, and the contact surfaces have an un-serrated section.

24 Claims, 2 Drawing Sheets

(56) References Cited

U.S. PATENT DOCUMENTS

| | | | | |
|---|---|---|---|---|
| 5,722,036 | A | 2/1998 | Shikata et al. | |
| 5,775,817 | A * | 7/1998 | Gottemoller | F16C 9/045 384/434 |
| 5,905,939 | A | 5/1999 | Ishijima et al. | |
| 6,276,233 | B1 * | 8/2001 | Bolyard, III | F16C 9/045 74/579 E |
| 6,609,299 | B2 * | 8/2003 | Adachi | F16C 9/04 29/521 |
| 7,217,035 | B2 * | 5/2007 | Damour | F16C 7/023 29/888.09 |
| 2003/0131683 | A1 * | 7/2003 | Giannone | F16C 7/023 74/579 R |
| 2015/0247528 | A1 * | 9/2015 | Pumareda | F16C 7/023 74/44 |

FOREIGN PATENT DOCUMENTS

| | | |
|---|---|---|
| DE | 198 33 363 A1 | 1/2000 |
| EP | 0815996 A1 | 1/1998 |
| EP | 0 889 202 A2 | 1/1999 |
| EP | 1 048 821 A2 | 11/2000 |
| EP | 2 913 541 A2 | 9/2015 |
| JP | S59-67163 A | 4/1984 |
| JP | 2012-246951 A | 12/2012 |

OTHER PUBLICATIONS

International Search Report and Written Opinion issued in connection with corresponding PCT Application No. PCT/EP2016/076816 dated Dec. 9, 2016.

Second Office Action issued in connection with corresponding AT Application No. A50950/2015 dated May 10, 2017 (English Translation Not Available).

International Preliminary report on patentability issued in connection with corresponding PCT Application No. PCT/EP2016/076816 dated May 8, 2018.

* cited by examiner

CONNECTING ROD

TECHNOLOGY FIELD

Embodiments of the present disclosure are directed to a connecting rod having a rod shaft and a rod cap. The rod shaft and the rod cap are configured to be releasably fastened through connecting means to form a connected state, and when the rod shaft and the rod cap are in the connected state they form a rod eye configured to enclose a bore for mounting the connecting rod on a crank shaft. The rod shaft and the rod cap have contact surfaces at which they touch each other in the connected state. The contact surfaces have an interlocking section-wise serration and the contact surfaces have an un-serrated section.

BACKGROUND

A connecting rod (short: conrod) transforms an oscillating motion of a piston into a rotating motion of a shaft. In reciprocating engines, for example, the reciprocating motion of the pistons is converted to a rotary movement of a crankshaft. The individual pistons are connected to the crankshaft by conrods. Other applications of conrods are pumps etc.

The conrod has a small conrod eye through which the conrod is connected by a pin to the piston of the reciprocating engine. Opposite of the small conrod eye and connected through the conrod shaft is the conrod head, also called the big conrod eye.

Usually, the conrod head is separable to enable the mounting on the crank shaft. The part of the conrod head, which can be separated from the conrod shaft, is called the connecting rod cap and is usually mounted through bolds to the remaining shaft. The separation plane can be perpendicular to the direction of the shaft, however an inclined or diagonal separation of the head (that is, a so-called diagonally split connecting rod) can be required to ease mounting and demounting of the conrod through a cylinder of the reciprocating piston engine.

High transverse forces result across the separation plane, which can be contained by means of a serration. Also known are cracked conrods at which the contact surfaces are created through a brittle fracture of the big eye. Cracked conrods are not within the scope of present patent application.

In the current state of the art, there exists a conrod with different interlocking serrations of the contact surfaces between the conrod head and the shaft.

For serrated conrods, drawbacks are typically observed at the bolted joint, in particular in the vicinity of the fastening means, through which the shaft and the head are pressed together, high stress concentrations are observed. Such local stress peaks can initiate a fatigue fracture at serration face edge of contact on the big conrod eye. This characteristic of the serrated joint is worsened when the eccentricity of the joint is increased. As the bolt position is brought further in, towards the bearing bore center, the eccentricity of the joint further raises the magnitude of the stress concentration as well as the propensity to fail under cyclic loading.

BRIEF DESCRIPTION

The object of the present disclosure therefore is to specify a conrod with a more even stress distribution in the contact surfaces between the conrod shaft and the conrod head to minimize stress risers associated with serration joint and bolt eccentricity.

This object is attained by a conrod as disclosed herein.

In that the contact surfaces have an un-serrated section, a markedly reduced stress level between the contact surfaces can be achieved.

It can be provided that the un-serrated section is formed at a section of the contact surfaces facing the bore, more particularily being adjacent to the bore.

The un-serrated section may be substantially flat.

It can be provided that the contact surfaces have at least one undercut at which the contact surfaces of the rod shaft and the rod cap do not touch each other in the mounted state of the conrod. In the context of the embodiments of the present invention, undercut means a recess in a contact surface. The undercut has shown to decrease principal stress on the innermost serration root.

In an embodiment it can be provided that the undercut directly merges into the un-serrated section. This means, that there is a direct transition from the undercut into the un-serrated section.

It can be provided that the undercut is located more distant from the bore than the un-serrated section. In other words, the un-serrated section is between the bore to accommodate a crankshaft and the undercut.

In an embodiment, the connecting means to connect the rod shaft and the rod cap are formed by screws, which can be led through screw bores and wherein the undercut is located in the area of the at least one screw bore. This configuration may be particularly beneficial with respect to the stress distribution in the contact surfaces.

The undercut may, for example, exhibit a span width of approximately half of the span width of the serration.

An embodiment of the disclosure achieves a more homogenous distribution of the surface pressure between the contact surfaces by means of a dedicated interferential load transfer path; i.e. the un-serrated section or "plateau", An embodiment of the disclosure achieves isolation of the compressive and transverse loads (created by the assembly and operating loads) on the plateau and serrations respectively, An embodiment of the disclosure achieves reduction of the 1st principal stress on the innermost serration root by means of a dedicated "undercut".

Thereby, according to embodiments of the disclosure, higher safety factors against low and high cycle fatigue as well as higher margin to plastic deformation can be achieved with otherwise unchanged dimensioning of the conrod.

BRIEF DESCRIPTION OF THE DRAWINGS

Embodiments of the disclosure are explained in more detail by help of the following figures, wherein.

DETAILED DESCRIPTION

Figure 1C:
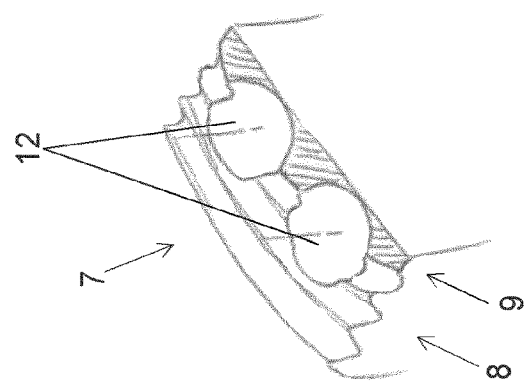
FIGS. 1A, 1B, and 1C show a conrod and details thereof.
Figure 1B:
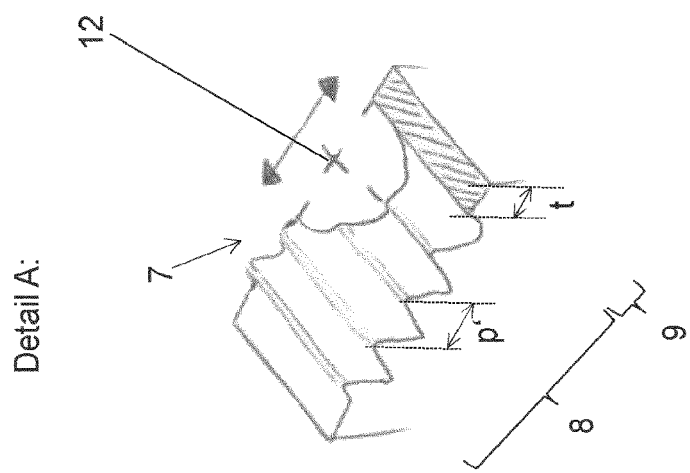
Figure 1A:
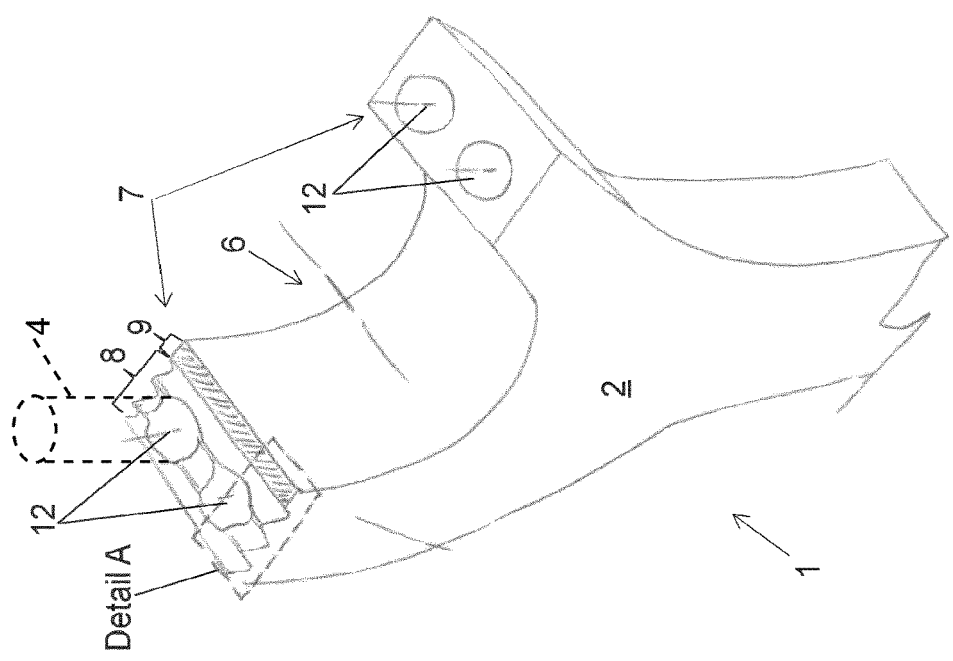

FIG. 1A shows a detail of a conrod shaft 2 of a conrod 1 in a 3D-view, according to a first embodiment. Through bores 12 for accommodating a fastening means 4 a conrod cap 3 (not shown) can be connected to the conrod shaft 2.

The conrod shaft 2 has contact surfaces 7, which engage with corresponding contact surfaces of the conrod cap 3 (see FIGS. 2A, 2B, and 2C) in the mounted state. To simplify matters, the details of the contact surface 7 are shown only for one surface 7 in FIG. 1A, but they are of course present for all of them.

The contact surface 7 has a serration 8 to contain the transverse forces across the separation plane.

A serration 8 however causes stress peaks in the cross section of the contact surfaces, which cross section is reduced by the bores 12 for accommodating the fastening means 7; in particular such stress peaks are observed at the root area of the serration 8 due to the edge of contact loading from the mated interfacial faces. Such stress peaks can approach, or reach the elastic limit of the material and cause a plastic deformation of this area of the serration 8 and can initiate a high cycle fatigue fracture. The edge of the bolt hole therefore becomes highly vulnerable to cyclic loading.

With separated conrods, fastening means 4 are placed as close as possible to the bore 6 for accommodating the crank shaft 13. Thereby, it is prevented that the contact surfaces 7 lift from each other through the forces acting at the bore 6 and that bending forces are induced to the fastening means 4.

According to an embodiment, the contact surface 7 further exhibits an unserrated section 9.

In the present embodiments, the bores 12 for accommodating a fastening means 4 are entirely located in the serration 8. In the direction towards a bore 6, in which in the mounting state the conrod shaft 2 and the conrod cap 3 can enclose a crank shaft 13 (not shown), the serration 8 is delimited by the unserrated section 9.

FIG. 1B shows detail A from FIG. 1A. The longitudinal axis of the bore 12 for accommodating the fastening means 4 can be at different positions with respect to the contact surface 7. In the present variant, the bore 12 is entirely in the serration 8 and the unserrated section 9 adjoins the bore 12. The serration 8 in the present case extends straight and parallel to the longitudinal axis of the bore 6.

According to the embodiment shown in FIG. 1C however, the serration 8 is swept or curved. The serration 8 extends flat, that is within the separation plane of the conrod 1, however, the serration 8 exhibits a curvature, which eases centering of the conrod cap 3 (see FIGS. 2A, 2B, and 2C), when mounting it to the conrod shaft 2. Different to the embodiment shown before, the bores 12 for accommodating the fastening means 4 are located approximately equally in the serration 8 and in the unserrated section 9. Of course, the position of the bores 12 within the contact surface 7 can be varied also at the conrod 1 with swept serration. The depth t of the unserrated section 9 can be chosen differently. Typically, the depth t is smaller than 2 pitches p' of the serration 8. A variation of the depth t results in different aspect ratios of the unserrated section 9.

Through the design of the contact surfaces 7 with an unserrated section 9, as illustrated by way of the embodiments 1A to 1C, markedly reduced stress intensity in the area of the contact surface 7 at its portion adjoining the bore 6 can be observed.

Figure 2A:
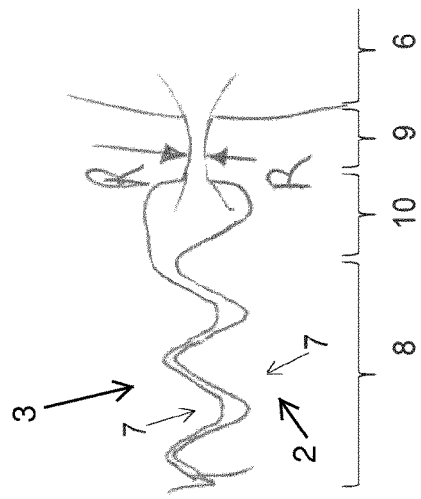
FIGS. 2A, 2B, and 2C show detailed views of the serration of the contact surfaces.
Figure 2B:
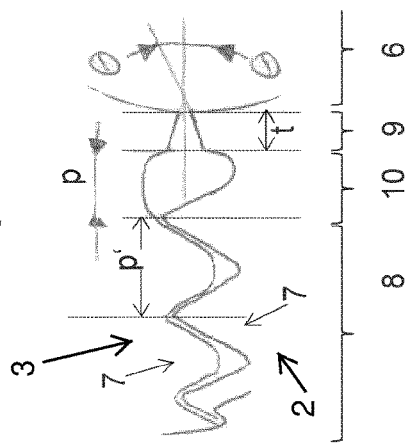
Figure 2C:
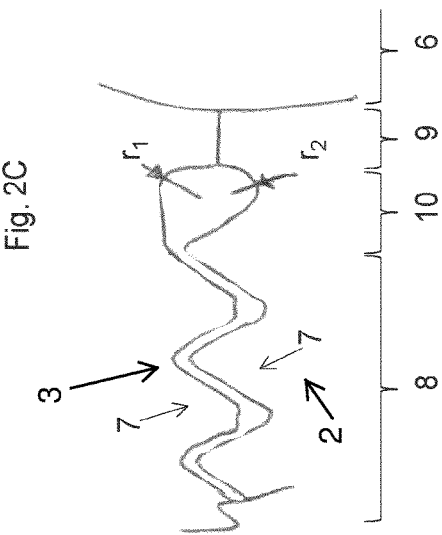

FIGS. 2A through 2C show further embodiments of the contact surface 7.

FIG. 2A shows a cross section through the contact surfaces 7 in the mounting state of a conrod 1. As explained before, the contact surface 7 shows a serration 8. In the embodiment according to FIG. 2A an undercut 10 is foreseen between the serration 8 and the unserrated section 9. The breadth b of the undercut 10 can be for example at least half of the pitch p' of the serration 8. The unserrated section 9 in the present embodiment slightly tapers with respect to the bore 6 at an angle θ. A slight taper of the unserrated section 9 can for example be foreseen, to increase the pressure on the back of a bearing, which can be placed in the bore 6, or for example to insure a contact between the contact surfaces 7 in spite of manufacturing tolerances, or for example to adjust a certain pressure profile within the contact surfaces 7.

FIG. 2B shows a detail of the design of the unserrated section 9. The unserrated section 9 not necessarily consists of flat sections, but the opposing sections of the contact surfaces 7 may exhibit a curvature R. By this, it is facilitated to define a contact point in spite of manufacturing tolerances and/or to adjust a certain pressure profile within the unserrated section 9.

The length p of the undercut 10 can be chosen such that a certain measure of stress reduction is achieved. The length t of the unserrated section 9 can be different to the length p of the undercut 10.

FIG. 2C illustrates a further constructive detail of the undercut 10. Accordingly, the undercut 10 can be shaped with different radii r1, r2. The profile of the undercut 10 is not necessarily circular.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A connecting rod, comprising:
a rod shaft; and
a rod cap,
wherein the rod shaft and the rod cap are configured to be releasably coupled together in a connected state surrounding a bore that receives a crank shaft;
wherein the rod shaft and the rod cap have respective first and second surfaces at least partially disposed against one another in the connected state;
wherein the first surface has a first serrated section and a first un-serrated section and the second surface has a second serrated section and a second un-serrated section; and
wherein at least one of the first or second surfaces has an undercut disposed at least partially between the first serrated section and the first un-serrated section or at least partially between the second serrated section and the second un-serrated section, wherein the first and second surfaces is greatest along the undercut at a distance away from the bore.

2. The connecting rod according to claim 1, wherein the first and second un-serrated sections are positioned closer to the bore than the first and second serrated sections.

3. The connecting rod according to claim 1, wherein each of the first and second un-serrated sections is substantially flat.

4. The connecting rod according to claim 1, wherein the undercut comprises at least one recess in at least one of the first surface or the second surface.

5. The connecting rod according to claim 1, wherein the first un-serrated section is configured to be at least partially spaced from the second un-serrated section to define a gap between the first and second surfaces in the connected state.

6. The connecting rod according to claim 1, wherein the undercut at least partially overlaps both the first serrated section and the first un-serrated section, or the undercut at least partially overlaps both the second serrated section and the second un-serrated section, or a combination thereof.

7. The connecting rod according to claim 1, wherein the rod shaft and the rod cap are releasably coupled together by one or more threaded fasteners extending through fastener bores, and wherein the undercut extends to the fastener bores.

8. The connecting rod according to claim 1, wherein the undercut at least partially overlaps at least one serration in the first or second serrated section, wherein the undercut extends at least from a peak to a root of the at least one serration.

9. The connecting rod according to claim 5, wherein the gap is at least partially defined by a first tapered surface in the first un-serrated section of the first surface, or a second tapered surface in the second un-serrated section of the second surface, or a combination thereof.

10. The connecting rod according to claim 5, wherein the gap is at least partially defined by a first curved surface in the first un-serrated section of the first surface, or a second curved surface in the second un-serrated section of the second surface, or a combination thereof.

11. The connecting rod according to claim 5, wherein the gap comprises a converging portion, a diverging portion, or a combination thereof, in a direction toward the bore.

12. The connecting rod according to claim 1, wherein a plurality of serrations in the first and second serrated sections:
   extend substantially parallel with one another; or
   extend along a central axis of the bore, wherein the plurality of serrations are disposed at progressively greater distances away from the central axis of the bore; or
   a combination thereof.

13. The connecting rod according to claim 1, wherein the spacing between the first and second surfaces is greatest along the undercut at a position between the first serrated section and the first un-serrated section or between the second serrated section and the second un-serrated section.

14. The connecting rod according to claim 1, wherein the first and second serrated section each comprise a plurality of serrations, each serration of the plurality of serrations extends a length and terminates at first and second ends that are spaced apart from one another, and each serration of the plurality of serrations curves along the length between the first and second ends.

15. An apparatus, comprising:
   a rod shaft;
   wherein the rod shaft is configured to be releasably coupled together with a rod cap in a connected state surrounding a bore that receives a crank shaft;
   wherein the rod shaft has a first surface configured to be at least partially disposed against a second surface of the rod cap in the connected state;
   wherein the first surface has a first serrated section and a first un-serrated section; and
   wherein an undercut between the first surface and the second surface at least partially overlaps both the first serrated section and the first un-serrated section, wherein, along the undercut, the first and second surfaces are at least partially asymmetric about an axis directed toward the bore, and the undercut is configured such that the first and second surfaces do not contact one another at the undercut.

16. The apparatus according to claim 15, wherein the first un-serrated section is positioned closer to the bore than the first serrated section, and the first un-serrated section is configured to be at least partially spaced from a second un-serrated section of the second surface to define a gap between the first and second surfaces in the connected state.

17. The apparatus according to claim 16, wherein the first un-serrated section of the first surface comprises a first tapered surface configured to at least partially define the gap.

18. The apparatus according to claim 16, wherein the first un-serrated section of the first surface comprises a first curved surface configured to at least partially define the gap.

19. An apparatus, comprising:
   a rod cap;
   wherein the rod cap is configured to be releasably coupled together with a rod shaft in a connected state surrounding a bore that receives a crank shaft;
   wherein the rod cap has a first surface configured to be at least partially disposed against a second surface of the rod shaft in the connected state;
   wherein the first surface has a first serrated section and a first un-serrated section; and
   wherein an undercut between the first surface and the second surface at least partially overlaps both the first serrated section and the first un-serrated section, wherein, along the undercut, the first and second surfaces are at least partially asymmetric about an axis directed toward the bore, and the undercut is configured such that the first and second surfaces do not contact one another at the undercut.

20. The apparatus according to claim 19, wherein the first un-serrated section is positioned closer to the bore than the first serrated section, and the first un-serrated section is configured to be at least partially spaced from a second un-serrated section of the second surface to define a gap between the first and second surfaces in the connected state.

21. The connecting rod according to claim 1, wherein the undercut is shaped differently than the first and second serrated sections and the first and second un-serrated sections.

22. The apparatus according to claim 19, wherein the first un-serrated section of the first surface comprises a first curved surface.

23. The apparatus according to claim 19, wherein the undercut defines a spacing between the first and second surfaces that changes from a first spacing to a second spacing, the first spacing is radially closer to the bore than the second spacing, and the second spacing is greater than the first spacing.

24. The apparatus according to claim 15, wherein the undercut defines a spacing between the first and second surfaces that changes from a first spacing to a second spacing, the first spacing is radially closer to the bore than the second spacing, and the second spacing is greater than the first spacing.

* * * * *